US00RE40353E

(19) United States
(12) Reissued Patent
Walcott, Jr. et al.

(10) Patent Number: US RE40,353 E
(45) Date of Reissued Patent: Jun. 3, 2008

(54) AUTO HANG TAG WITH RADIO TRANSPONDER

(76) Inventors: James D. Walcott, Jr., 711 N. A Street, Fort Smith, AR (US) 72901; Jerry Snow, Rt. 4, Box 141, Muldrow, OK (US) 74948

(21) Appl. No.: 11/491,531

(22) Filed: Jul. 21, 2006

Related U.S. Patent Documents

Reissue of:
(64) Patent No.: 6,956,472
Issued: Oct. 18, 2005
Appl. No.: 10/425,128
Filed: Apr. 28, 2003

(51) Int. Cl.
*G08B 26/90* (2006.01)

(52) U.S. Cl. ..... 340/505; 340/572.1; 340/572.7; 340/10.1

(58) Field of Classification Search ..... 340/505, 340/572.1, 572.7, 10.1, 10.32, 10.42, 933, 340/886
See application file for complete search history.

(56) References Cited

U.S. PATENT DOCUMENTS

| | | | | |
|---|---|---|---|---|
| 3,098,971 | A | 7/1963 | Richardson | 325/9 |
| 4,075,632 | A | 2/1978 | Baldwin et al. | 343/6.8 |
| 4,782,345 | A | 11/1988 | Landt | 343/727 |
| 4,786,907 | A | 11/1988 | Koelle | 342/51 |
| 4,816,839 | A | 3/1989 | Landt | 343/795 |
| 5,525,991 | A | 6/1996 | Nagura et al. | 342/42 |
| 5,661,473 | A | 8/1997 | Paschal | 340/933 |
| 5,664,113 | A | 9/1997 | Worger et al. | 705/28 |
| 5,771,021 | A | 6/1998 | Veghte et al. | 343/700 |
| 5,777,561 | A | 7/1998 | Chieu et al. | 340/825.54 |
| 5,912,632 | A | 6/1999 | Dieska et al. | 340/825.54 |
| 6,084,530 | A | 7/2000 | Pidwerbetsky et al. | 340/825.54 |
| 6,118,379 | A | 9/2000 | Kodukula et al. | 340/572.8 |
| 6,121,880 | A | 9/2000 | Scott et al. | 340/572.5 |
| 6,197,396 | B1 * | 3/2001 | Haas et al. | 428/40.1 |
| 6,215,402 | B1 * | 4/2001 | Rao Kodukula et al. | 340/572.8 |
| 6,236,315 | B1 | 5/2001 | Helms et al. | 340/572.7 |
| 6,275,157 | B1 | 8/2001 | Mays et al. | 340/572.5 |
| 6,278,413 | B1 | 8/2001 | Hugh et al. | 343/818 |
| 6,307,524 | B1 | 10/2001 | Britain | 343/795 |
| 6,320,509 | B1 | 11/2001 | Brady et al. | 340/572.7 |
| 6,353,443 | B1 | 3/2002 | Ying | 345/702 |
| 6,765,476 | B2 | 7/2004 | Steele et al. | 340/10.4 |
| 6,832,206 | B1 * | 12/2004 | Chelnik | 705/13 |
| 6,992,564 | B2 * | 1/2006 | Connolly et al. | 340/5.62 |
| 2002/0087395 | A1 * | 7/2002 | Goodman | 705/13 |

* cited by examiner

*Primary Examiner*—Toan N. Pham
(74) *Attorney, Agent, or Firm*—Keisling Pieper & Scott PLC; Robert R. Keegan

(57) ABSTRACT

There is disclosed an automobile hang tag for use in parking control and the like with an integral radio transponder, together with interrogator apparatus associated therewith in a system for parking control or other purposes. The detection range for the RFID interrogator and transponder is at least about six meters (20 feet) to enable rapid control monitoring of parking facilities from a moving vehicle through the back window or front windshield of parked vehicles. Reliable and trouble-free monitoring of the hang tags in a customary rear view mirror location is facilitated by employing directional antennas in the RFID hang tags, increasing the antenna gain while suppressing false signals and noise and improving the range-to-power ratio for the system. The RFID hang tags may be battery powered but are preferably unpowered RFID transponders. Suitable directional antennas employed may include Yagi antennas, log periodic antennas, stacked dipole antennas, spiral or slot antennas or other monodirectional or bidirectional antennas, preferably those suitable for selected frequencies within the 1,000 megahertz to 10,000 megahertz range.

20 Claims, 5 Drawing Sheets

AUTO HANG TAG WITH RADIO TRANSPONDER

Matter enclosed in heavy brackets [ ] appears in the original patent but forms no part of this reissue specification; matter printed in italics indicates the additions made by reissue.

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

This invention relates to the field of radio frequency identification transponders (RFID tags), and particular applications thereof involving vehicle identification and parking control systems.

RFID tags receive RF electromagnetic radiation from an interrogating transmitter and return information recorded in the tag to a receiver and computer which is usually associated with the interrogator transmitter.

RFID tags can and have been used in many ways for locating or identifying tagged objects including animals, people, vehicles, or other objects either stationary or mobile. Usually the RFID tag returns distinctive information from the particular tag which may be variable or invariable in nature.

As shown in U.S. Pat. No. 3,098,971 to R. M. Richardson, it has long been proposed that the power necessary to transmit the return signal from the transponder be provided by the much stronger signal that is received by the transponder. This eliminates the necessity for a battery or other power source for the tag. Such an RFID tag is referred to as a passive tag, and it is the preferred form for use in the present invention. The present invention is not limited to such passive tags, however, and could be implemented with battery powered tags.

In an RFID tag of the passive type an interrogator signal picked up by the antenna of the tag induces an alternating current in an antenna circuit which may be rectified by an RF diode, and this rectified current can be used in a power supply for the electronic components of a microcircuit. A digital memory element of the microcircuit stores identification information and/or other data. A lower frequency signal generated in the microcircuit is caused to modulate the return signal transmitted from the RFID antenna thereby communicating information coded in the lower frequency signal modulation may be implemented either by altering the antenna loading or by other suitable form of modulation. Thus the RFID tag may be interrogated by a signal which both communicates with the RFID tag and supplies the power for its circuit so that the RFID tag can respond with an information carrying signal from its transmit antenna, all without requiring a battery or other power source for the RFID tag. In some systems information in signals received from the interrogator may be stored in a digital memory of the transponder as well.

Further refinements in RFID tag technology were made as shown in U.S. Pat. No. 4,075,632 to Baldwin et al. wherein tags were proposed with logic and read/write memories and transistors for modulating the return signal were also powered by the energy received by the transponder. Such refinements are also shown in U.S. Pat. No. 4,786,907 to Akoelle.

While improvements in semiconductor technology to provide microcircuits which are smaller and have lower power requirements have increased the capability of RFID tags and the systems which employ them, there are limitations which have still not been entirely overcome, particularly in the passive type of RFID tags. Use of such tags where the distance between the interrogator and the transponder is more than a few feet or about one meter presents difficulties. The amount of power transmitted by the interrogator is subject to regulations as well as practical limitations so that the effect of the well known square-of-the-distance power reduction factor militates against reliable use at longer ranges. There is an associated problem exacerbated by the low magnitude of the return signal power in that frequently more than one RFID tag is in the area being interrogated, presenting the likelihood that interference between return signals from different tags will adversely affect the reliability of a system.

BRIEF SUMMARY OF THE INVENTION

The present invention relates to systems for parking control or other similar purposes utilizing automobile hang tags incorporating RDIF transponders with directional antennas facilitating remote interrogation of such transponders with increased range and reliability. When employed in a parking control application the detection range for the RFID interrogator and transponder will be at least about 6 meters (about 20 feet) and enables rapid control in monitoring of parking facilities from a moving vehicle employing a transmission path through the back window or the front windshield of parked vehicles. In a system according to the invention customary high gain directional antennas will be employed for the mobile interrogator unit, but the usual omni directional or low gain antennas or RDIF tags are replaced by directional high gain antennas for receiving the transmission from the interrogator and transmitting the reply signal to the interrogator. This is particularly useful in the vehicle parking control application, for in such systems the tags may conveniently be placed in the vehicle in a specified orientation, and the vehicles themselves will be arranged in prearranged parking stalls.

Thus according to the invention the combined directivity and associated gain for both the interrogator antenna and the transponder antenna are utilized to increase the range and sensitivity for response signals from hang tags in a predetermined preferred direction, while at the same time reducing the likelihood of interference from other hang tags in nearby vehicles. It is important that this system serves to increase the normal range-to-power ratio permitting use of lower power interrogator signals well within regulatory requirements. Suitable directional antennas employed may include Yagi antennas, log periodic antennas, stacked dipole antennas, spiral or slot antennas or other known monodirectional or bidirectional antenna forms. It is preferred that any radio frequencies employed be within the 1,000 megahertz to 10,000 megahertz range; a basic design approach for such antennas may include scaling of television or other communication antennas to smaller size and higher frequency.

Other known interference reduction techniques may be employed in the controllers software of the system, and, if desired, further interference reduction may be achieved by using radar techniques to maintain a range window corresponding to response signal return time. By this approach transponder return signals from more than a specified distance, 8 meters or 25 feet for example, may be suppressed to eliminate interference from such sources.

Certain specific designs of directional antennas are of interest and in particular those derived utilizing the antenna design techniques of the prior art listed below and incorporated by reference herein. Also listed below are vehicular RFID related patents.

U.S. Pat. No. 4,782,345 issued to Landt on Nov. 1, 1988; U.S. Pat. No. 4,786,907 issued to Koelle on Nov. 22, 1988; U.S. Pat. No. 4,816,839 issued to Landt on Mar. 28, 1989; U.S. Pat. No. 5,525,991 issued to Nagura et al. on Jun. 11, 1996; U.S. Pat. No. 5,661,473 issued to Paschal on Aug. 26, 1997; U.S. Pat. No. 5,771,021 issued to Veghte et al. on Jun. 23, 1998; U.S. Pat. No. 5,777,561 issued to Chieu et al. on Jul. 7, 1998; U.S. Pat. No. 5,912,632 issued to Dieska et al. on Jun. 15, 1999; U.S. Pat. No. 6,118,379 issued to Kodukula et al. on Sep. 12, 2000; U.S. Pat. No. 6,121,880 issued to Scott et al. on Sep. 19, 2000; U.S. Pat. No. 6,215,402 issued to Rao Kodukula et al. on Apr. 10, 2001; U.S. Pat. No. 6,236,315 issued to Helms et al. on May 22, 2001; U.S. Pat. No. 6,278,413 issued to Hugh et al. on Aug. 21, 2001; U.S. Pat. No. 6,307,524 issued to Britain on Oct. 23, 2001; U.S. Pat. No. 6,320,509 issued to Brady et al. on Nov. 20, 2001; and U.S. Pat. No. 6,353,443 issued to Ying on Mar. 5, 2002.

It is an object of the present invention to provide an automobile hang tag of convenient size and shape including the RFID transponder enabling the information recorded in the hang tag to be accessed by radio frequency identification (RFID) apparatus as well as visually or optically.

It is another object of the present invention to provide an RFID tag to be temporarily affixed in the interior of an automobile with a transponder circuit and directional antenna enabling it to be reliably interrogated from a distance of at least one car length (about 20 feet or 6 meters).

It is still another object of the present invention to provide a vehicle control system with RFID hang tags for mounting in the interior of vehicles for identification thereof and/or data related thereto, together with interrogator apparatus mounted in a vehicle enabling rapid identification among a plurality of vehicles such as those within a parking area to enable control and monitoring of parking facilities from a moving vehicle or for other purposes.

It is yet another object of the present invention to provide a vehicle identification system including automobile hang tags with individual RFID transponders and a vehicle mounted RFID interrogator such that the transmission and reception characteristics of the transponder and interrogator facilitate communication of coded information from the transponder through the rear window (or the front windshield) of vehicles while the interrogator is being transported along a line of parking stalls in a parking facility.

It is a further object of the present invention to provide RFID hang tags for such a parking control system which are not battery powered (i.e., passive tags) having the necessary range of operation through exploitation of antenna gain and directivity.

A still further object of the present invention is to provide RFID tags with antennas having bidirectional or monodirectional radiation patterns in the horizontal plane.

Other objects and advantages of the invention will be apparent from consideration of the following description in conjunction with the appended drawings described below.

DETAILED DESCRIPTION OF THE INVENTION

Figure 1:
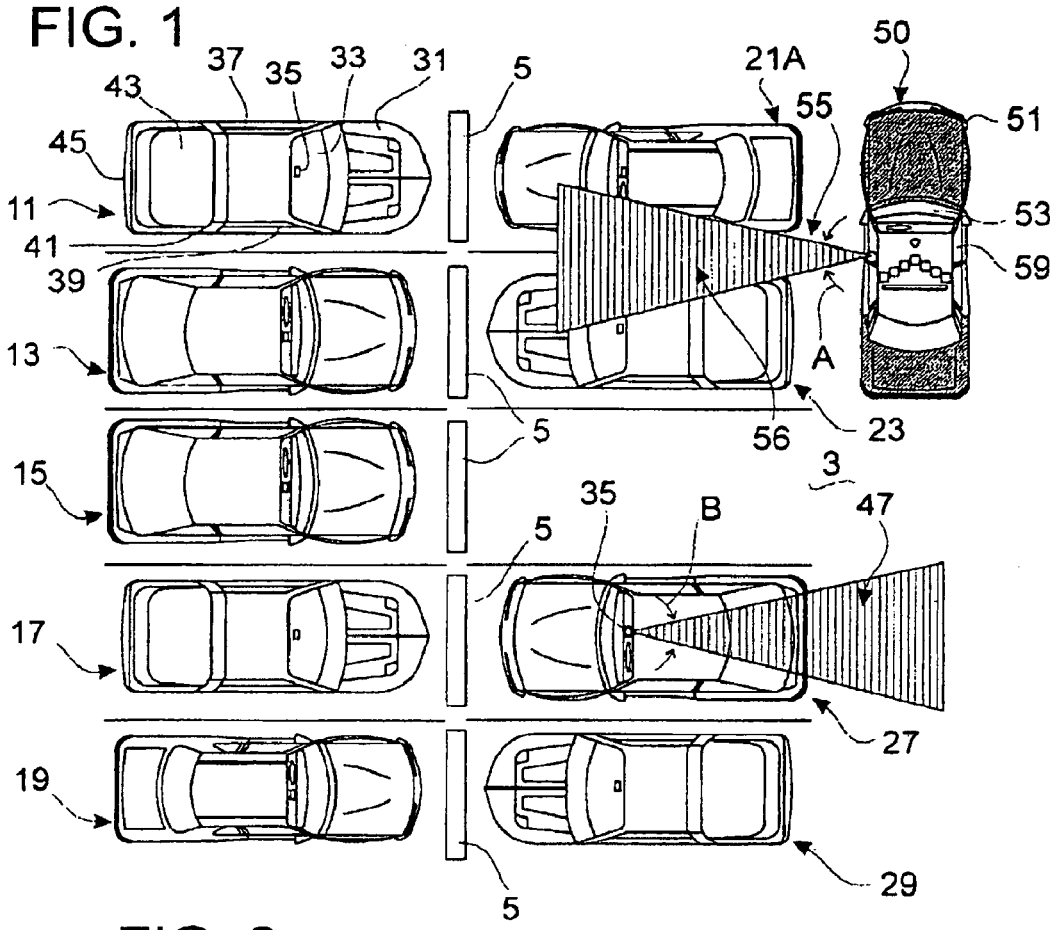
FIG. 1 is a partially schematic diagram of a parking facility with vehicles fitted with RFID auto hang tag responders and a monitoring vehicle with interrogator apparatus according to the invention.

FIG. 1 shows partially schematically a parking facility and an exemplary form of parking control system incorporating features of the present invention. The parking facility 3 could be of any form but is illustrated having a double row of parking stalls separated by barriers 5.

Vehicles such as automobile 11 are parked front to front on either side of the barriers 5. The vehicles may be of any style and automobile 11 has a common configuration including a vehicle hood 31, front windshield 33, side windows 37 and 39, metal roof 41, back window 43, and rear portion 45. According to the invention a distinctive automobile hang tag 35 is situated near the rear view mirror of automobile 11; such hang tag has a long range, preferably directional propagation, RFID tag incorporated therein. Each of the other vehicles shown, automobiles 13, 15, 17, 19, 21, 23, 27 and 29 will be understood to be generally similar to automobile 11 for the purpose of explaining FIG. 1. It should be understood, however, that other styles of vehicles such as vans, small trucks and the like can be accommodated in the system with little or no adjustment.

According to this embodiment of the invention an interrogator 55 for communicating with the RFID transponder of hang tags 35 is preferably mounted in or on a security or control vehicle 50. Vehicle 50 has a front hood 51, front windshield 53, left side window 57, and right side window 59. The interrogator 55 may conveniently be mounted at a left side window 57 and/or right side window 59. The transmitter of the interrogator 55 preferably has a directivity pattern provided by its antenna which helps to eliminate interference from multiple response signals of adjacent automobiles such as 21 and 23 as shown in FIG. 1. The optimum directivity may be determined by consideration of the parameters shown in FIG. 1. These parameters are:

T-average center to center distance of rear view mirrors holding parking permit hang tag with RFID.

D—depth of field of RF interrogator.

V—variation in length of vehicles.

A—aperture (cone) of the signal from RF interrogator.

B—aperture (cone) of the signal from RFID transponder.

For clarity the B-aperture for the RFID transponder is shown relative to the transponder 35 of vehicle 27 as pattern 47. It will be understood however that all the RFID transponders 35 will have similar directivity as indicated by pattern 47 and its B-aperture.

As shown in FIG. 1 the desirable directivity parameters cause the maximum for A to be such that at the end of zone D, representing depth of field, that the width of the aperture cone 56 is no greater than T. This provides the desired effect of transmitting the interrogating signal essentially to one transponder at a time and effectively eliminates the likelihood of interference from simultaneous response from two adjacent vehicles.

According to the invention a similar employment of directivity in the transponder antenna enhances this effect and the reliability of the system as shown by the pattern 47 and the B aperture thereof. In the case of the hang tag transponders 35 the directivity pattern 47 increases the sensitivity for transmissions from interrogator 55 when aligned with vehicle 27 and at the same time renders the transponder 35 of vehicle 27 relatively insensitive when the interrogator vehicle 50 is in a position to interrogate some other vehicle such as a vehicle 29. Usually the pattern for transmitting a response from RDIF transponders 35 will have similar directivity and, to some degree, this may also reduce likelihood of interfering signals being received at the interrogator 55. While there will be unwanted reflected radiation in this environment, it too will tend to be suppressed by the directivity considerations discussed above.

The diagrams of FIG. 1 indicating interrogator and transponder directivity are schematic and it will be appreciated that actual RF antenna transmission and reception patterns are not precisely directional in the manner depicted in FIG. 1. It is reasonable to consider that the angle of directivity such as A or B represents the half power point of the pattern. Of course the pattern does not sharply terminate at a prescribed distance. Also, in some embodiments the pattern will be bidirectional rather than as shown in FIG. 1. In situations such as shown in FIG. 1 where there are double rows of vehicles so that a transmission from an interrogator vehicle 50 which is aligned with a vehicle in one of the rows will also be aligned with a more distant vehicle in a second row, the directivity of the interrogator signal clearly will not aid in preventing signal interference of two such aligned vehicles. However, the response of the more distant transponder will be lessened by the operation of the square of the distance rule for attenuation of distant signals. With passive transponders this attenuation by distance may approach a fourth power effect as is encountered in radar technology. If problems would be created by interference from substantially more distant RFID transponders, it may be eliminated by employing radar technology to suppress signals beyond a predetermined range by a range gate technique based on transmission return times.

Transponder antennas, such as directional antenna 140, preferably have horizontal polarization (as provided by horizontally disposed dipoles, for example). Other radiation polarization such as vertical polarization or circular polarization may be employed for the transponder antennas (and the interrogator antennas) as circumstances may indicate. Except for FIG. 8, the transponder antennas shown schematically have horizontal polarization, so that polarization would preferably be employed for the interrogator antenna. Discrimination against extraneous signals may be achieved by selection of horizontal polarization, and horizontal dipoles provide better directivity in the horizontal plane for suppressing response from untargeted RFID tag transponders.

The radiation pattern for RFID transponders 35 is indicated in FIG. 1 as being monodirectional, although the pattern could alternatively be bidirectional. The monodirectional pattern has the advantage that automobiles in a more distant row will usually have their RFID tags facing in an opposite direction thereby significantly reducing any possibility of interference from such tags. The advantage of bidirectional radiation patterns for the RFID tags is that they would be responsive through rear window or front window transmission paths without changing their orientation. Antennas with monodirectional and bidirectional radiation patterns will each be described.

In referring to bidirectional and monodirectional antennas it will be understood that there is some directivity associated with even the most omni-directional antennas. In referring to bidirectional or monodirectional antennas in this discussion it will be understood that these terms are meant to describe antennas with significantly greater directivity than an ordinary simple dipole antenna without intended directional characteristics.

Figure 2:
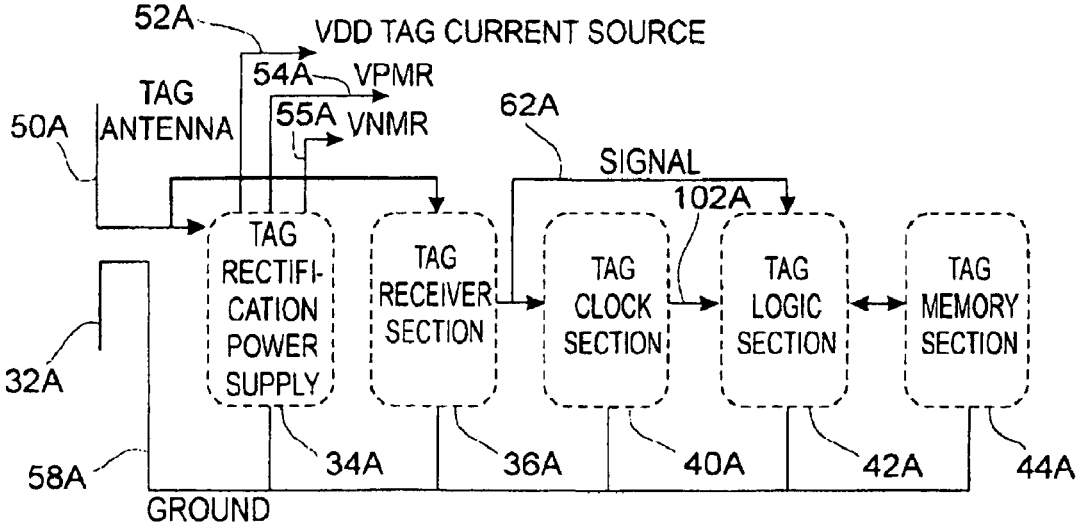
FIG. 2 PRIOR ART
FIG. 2 is a block diagram of one form of prior art conventional RFID tag circuit useful in implementing the present invention.

As shown in FIG. 2 prior art RFID tags of small dimensions using microcircuits powered only by energy received from the interrogator are known. Conventional forms thereof as shown in FIG. 2 include an antenna 32A connected to a ground 58A and antenna transmission line 50A. A tag rectification power supply 34A receives energy from antenna 32A and converts some of received radio frequency energy to DC to be conveyed through lines 52, 54 and 56 to a tag current source and other elements requiring direct current energization.

The transponder function is implemented by a tag receiver section 36A which feeds signals to a tag clock section 40A (in this embodiment) and to a tag logic section 42A. The tag clock section 40A also feeds a signal 102A to the tag logic section 42A which transmits information signals to and from a tag memory section 44A. The operation of such RFID transponders is described in detail in the references listed in the background section above.

Figure 3:
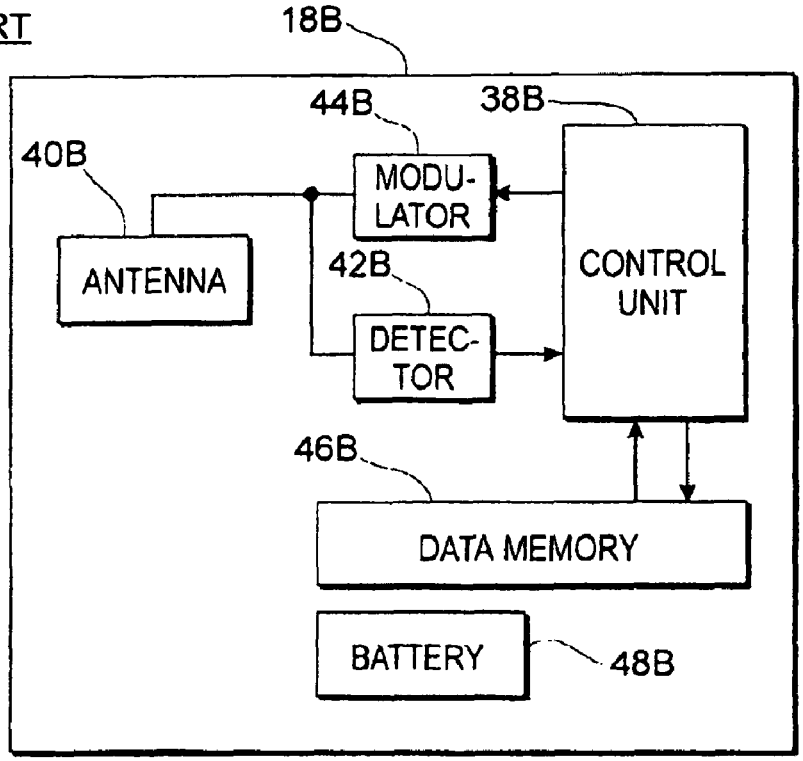
FIG. 3 PRIOR ART
FIG. 3 is a block diagram of another form of prior art conventional RFID tag circuit useful in implementing the present invention.

FIG. 3 shows a schematic block diagram of a prior art RFID tag of common form suitable for battery powered tags. The transponder circuit 18B including antenna 40B may be powered by an optional battery 48B (or may be adapted to use a portion of received energy to power the circuit as illustrated in FIG. 2). Radio frequency energy from antenna 40B is fed to detector 42B (and in the case of passive RFID tags would also supply energy for a rectification power supply). The detector signal from 42B is provided to control unit 38B having all the necessary logic and control functions programmed in a digital microcircuit. Control unit 38B has access to and from data memory 46B. Battery 48B would be utilized if the transponder was to be battery powered rather than passive. The control unit 38B directs information signals received from detector 42B and from data memory 46B to control modulator 44B which in turn sends the information modulated response signal to antenna 40B for transmission back to the system interrogator apparatus. The transponder apparatus shown in FIG. 3 may have the capability of recording data received through antenna 40B and detector 42B into data memory 46B if that function is desired. On the other hand, data memory 46B may be a read-only memory pre-programmed to simply identify the RFID transponder tag 18B and thus the vehicle or other object with which it is associated.

FIG. 4 is a schematic block diagram of exemplary electronic circuitry for the RFID transponder incorporated in automobile hang tags according to the present invention. Electronic circuitry is preferably implemented with microcircuit technology employing one or more integrated circuits. A transponder microcircuit 118 is connected to receive microwave signals from and send microwave signals to a directional antenna 140, to be more fully described below.

Signals received from antenna 140 are processed in a detector 142 and communicated to a control unit 138. Control unit 138 has micro circuitry programmed to carry out the control operations for the transponder in accordance with known computer digital logic technique and standards. The primary function of control unit 138 is to recognize an interrogation signal received through directional antenna 140 and to access a data memory 146 for data to respond to the interrogation signal. Data memory 146 is connected to control unit 138 to provide this capability. In more sophisticated RFID implementations the control unit 138 may have the capability of receiving data signals beyond the simple interrogation command and to store such data by writing it into the data memory 146. In this more sophisticated implementation the data stored in data memory 146 would be accessible for transmission in a response to a subsequent interrogation. These additional functions are optional, however, and the basic implementation of the RFID transponder requires a read-only memory for the identification function of the RFID microcircuit.

Figure 4A:
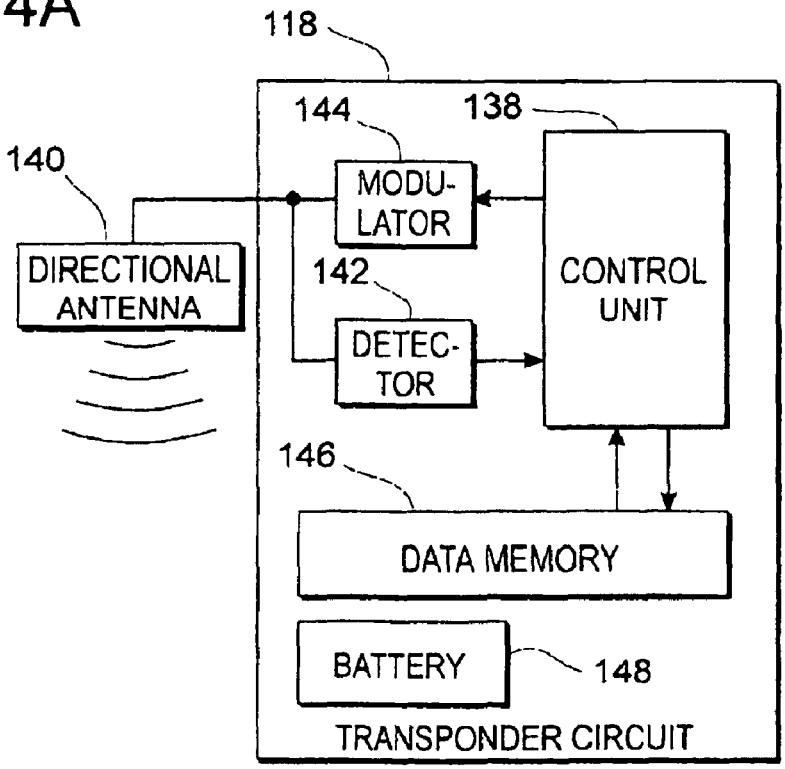
FIG. 4A is a schematic block diagram of an RFID transponder circuit and antenna for use in RFID hang tag transponders according to the invention.

An optional battery 148 is shown in FIG. 4A as included in microcircuit 118. As previously described, the preferable form of RFID tag is a passive one without a battery for reasons of simplicity and economy, but where circumstances prevent transmission of a signal with sufficient power to the transponder microcircuit to provide the required electrical energy, a battery 148 may be included to overcome that problem.

It is well known that the RFID circuits as shown in FIG. 4A can be made smaller, more compact and more efficient at higher frequencies and shorter wavelengths. Although frequencies from 100 megahertz to 900 megahertz could be employed for RFID apparatus according to the invention it is preferable that frequencies of about 900 megahertz and above be employed. Of these preferable frequencies it is probably best to employ frequencies of about 2,300 megahertz and above to allow compact size for the physical structure of the tag while providing strong directivity and high gain for the directional antenna.

The modulation frequency for microcircuit 118 encoding control information and data is subject to much variation as known in the art and may be selected from the range of 1 kilohertz to 1 megahertz. Amplitude modulation or other forms such as frequency or pulse modulation may be employed. The operation of the directional antenna 140 which is a primary feature of the invention favors higher operation frequencies and the concomitant shorter wavelengths, but otherwise no particular characteristics for known RFID transponder circuitry are required by the invention.

Figure 4B:
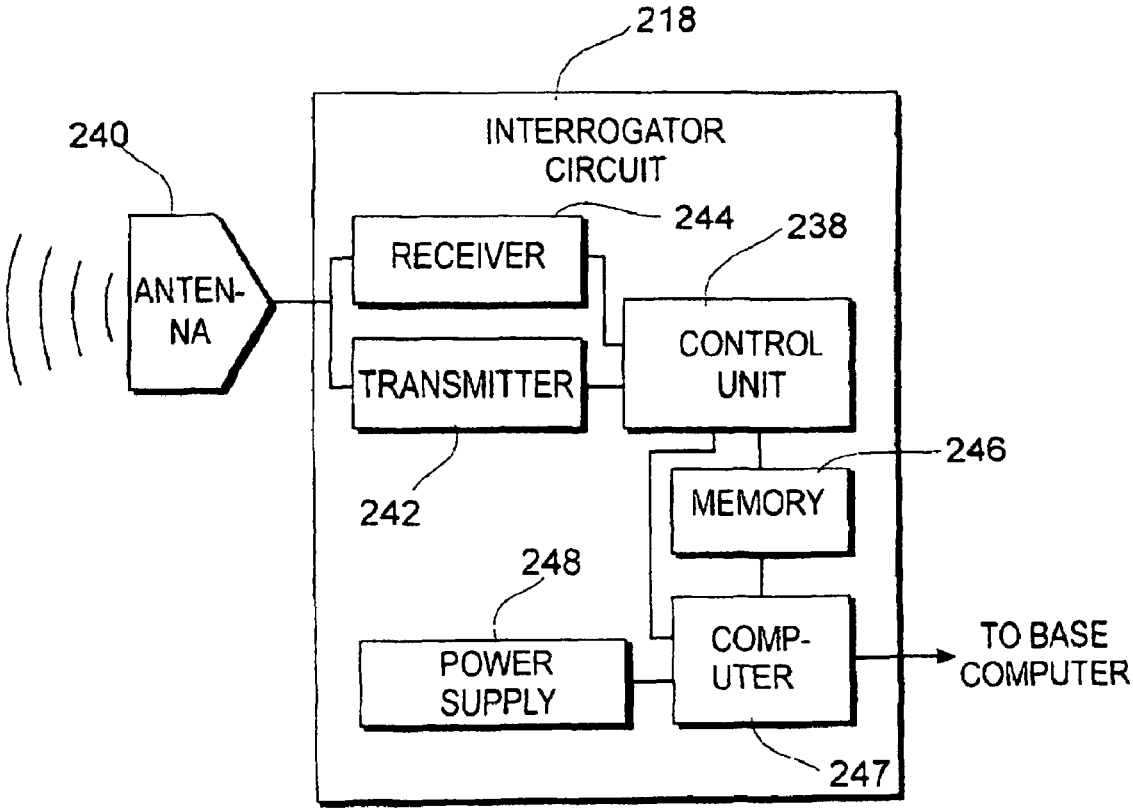
FIG. 4B is a schematic block diagram of an interrogator circuit used to interrogate and record information from RFID hang tag transponders as shown in the above Figures.

The interrogator circuit 218 shown in FIG. 4B is of any generally conventional form known in the art except for the need for a directive antenna such as antenna 240.

In FIG. 4B a usual arrangement where antenna 240 is employed both as a transmitter 242 antenna and a receiver 244 antenna is illustrated. It will be understood however that, particularly in the interrogator 55, and to a lesser extent in transponders 35, one might choose to have separate antennas for receiving and transmitting.

Interrogator circuit 218 includes a control circuit 238 preferably implemented with digital micro circuitry and programmed to control operations of transmitter 242 and receiver 244 and to communicate with memory 246 and computer 247, all of which are preferably implemented with integrated circuit technology in one or more circuits. Memory 246 is preferably a read/write memory and computer 247 includes a central processor unit and usual associated displays for locally communicating information to the operator.

In most instances the computer 247 will have a link to a base computer which will serve to collect, compile and store information and data received from one or more interrogators over a period of time. Interrogator circuit 218 is provided with a power supply 248 preferably including a storage battery rechargeable from a vehicle direct current system or from fixed alternating current receptacles.

The interrogator circuit 218 and the antenna 240 may be of well known conventional form provided only that the antenna 240 is capable of providing the directivity needed to carry out preferred forms of the invention. Since there are no severe limitations on the size or shape of the antenna 240, which will typically be mounted in or on a vehicle 50, desired antenna directivity can be achieved by common known techniques in the antenna art without difficulty.

Figure 5:
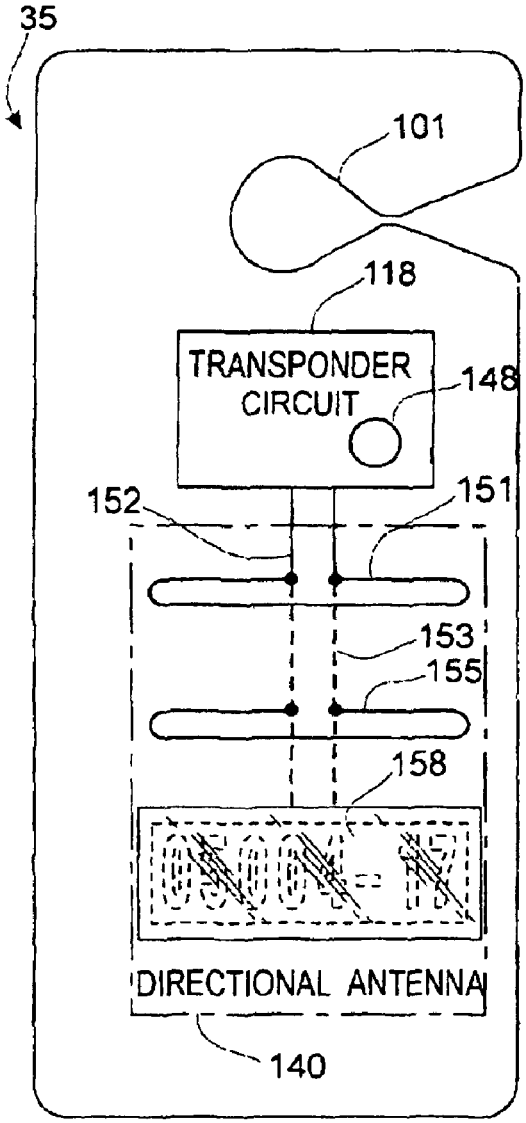
FIG. 5 is a partially schematic diagram of a first embodiment of RFID hang tag transponder according to the invention also illustrating visual indicia on the hang tag (which is omitted in following figures for simplicity and clarity)

More detail of an exemplary preferred form of auto hang tag with RFID transponder 35 is shown in FIG. 5. Hang tag 35 may be of a shape commonly used for such hang tags without RFID capability and may include an engagement opening 101 for affixing the tag in the vehicle in the rear view mirror with the tag oriented with the normal to its plane surface approximately horizontal and directed longitudinally fore and aft of the vehicle. This will normally provide a line of sight from one side of a tag through the vehicle front windshield and a line of sight from the opposite face of the tag through the vehicle rear window. If this situation does not prevail with a particular vehicle, accommodation can be made to locate the tag to provide a line of sight through a vehicle window so that microwave frequency radiation to and from the tag is not blocked or reflected. Usually heating wires in rear windows will not present a problem, but such can be overcome by using a different window.

As indicated in FIG. 5, hang tag 35 includes a transponder circuit 118 as previously described. While an optional battery 148 is shown it preferable that the transponder circuit be powered with received radio frequency energy so that battery 148 is not necessary.

As indicated in 158 the tag 35 will customarily include visual indicia that is found on auto hang tags without RFID capability. The showing of indicia 158 is exemplary only and indicia may occupy a larger area on the tag and be present on both the front and back surfaces thereof.

A particular form of directional antenna generally referred to as a stacked folded dipole antenna is illustrated in schematic form to be employed in the hang tag 35 of FIG. 5. By employing two or more vertically stacked horizontal dipoles, antenna 140 has increased directivity and increased gain as compared with a simple dipole antenna. A transmission line 152 of appropriate form connects folded dipole 151 to the transponder circuit 118 and an additional transmission line 153 also connects a second folded dipole 155 in parallel to the transponder circuit 118. Transmission line 153 may extend to additional folded dipoles not shown in FIG. 5.

By employing folded dipoles 151 and 155 the electrical length of each dipole is greater than its physical length and hence their optimum frequency may be lower than for an unfolded dipole; thus the antenna 140 of FIG. 5 with its folded dipoles will, if necessary, provide optimum quarter-wave (or other) antenna design for lower frequencies while keeping within the practical space restrictions imposed by the hang tag 35.

It may be noted that the antenna 140 of stacked folded dipole configuration shown in FIG. 5 is bidirectional rather than monodirectional. As previously discussed, this has the advantage that the transponder will respond equally well from two opposite directions so that it could be interrogated successfully through either the rear window or the front windshield of an automobile. It has the disadvantage that hang tags other than the one being targeted by the interrogator might respond in a manner to interfere, but any such problem can be overcome by processing received signals at the interrogator utilizing a range gate or other known techniques.

Figure 6:
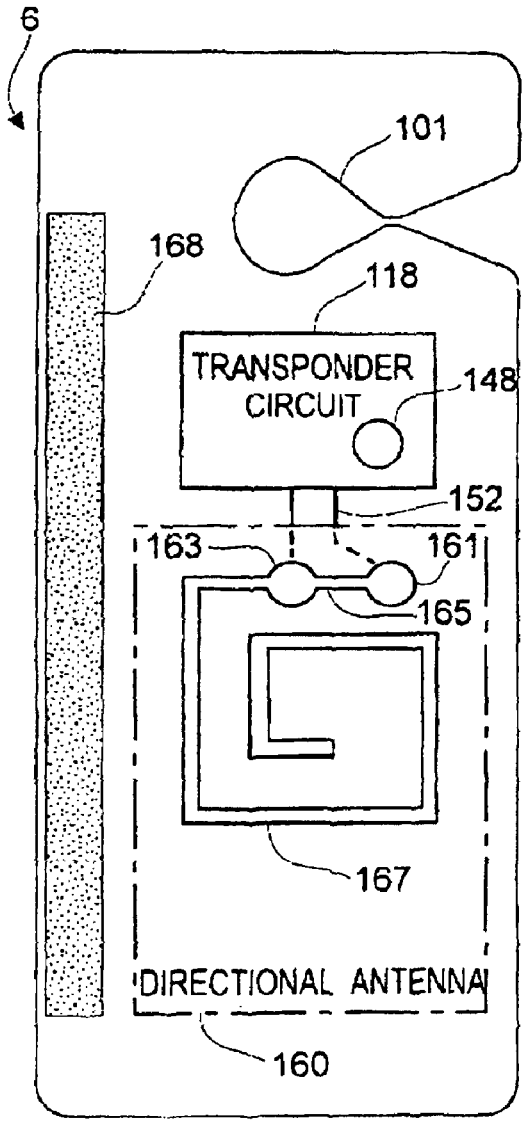
FIG. 6 is a partially schematic diagram of a second embodiment of RFID hang tag transponder according to the invention.

Antennas specifically for use in RFID tags implemented with printed circuit techniques have been developed and an adaptation of such antennas is utilized in the hang tag embodiment illustrated in FIG. 6. The antenna 160 incorporated in auto hang tag 6 illustrated in FIG. 6 is a spiral antenna similar to the antennas explained and discussed in U.S. Pat. No. 6,353,443 referred to above and the references cited therein.

Hang tag 6 may be of similar configuration to hang tag 35 and may be provided with an engagement opening 101. Hang tag 6 as well as the other hang tags illustrated herein may be modified to be dual purpose serving also as a magnetic data card by providing a magnetic strip 168 on an edge of the card located so as not to interfere with the operation of the RFID function of the hang tag.

Hang tag 6 has a transponder circuit 118 and may optionally be provided with a battery 148. Transponder circuit 118 is connected by a transmission line 152 to directional antenna 160; antenna 160 comprises a metallic strip 167 having a spiral or other convoluted shape; which fulfills the radiator function of the antenna. Optional matching elements may be provided for magnetic strip 167 such as matching bridge 165 connected between grounding post 161 and feed pin 163. Using known design considerations the directional antenna 160 and the metallic strip 167 will be configured to provide a desirable directivity pattern, center response frequency and bandwidth for the transponder function of hang tag 6.

Figure 7:
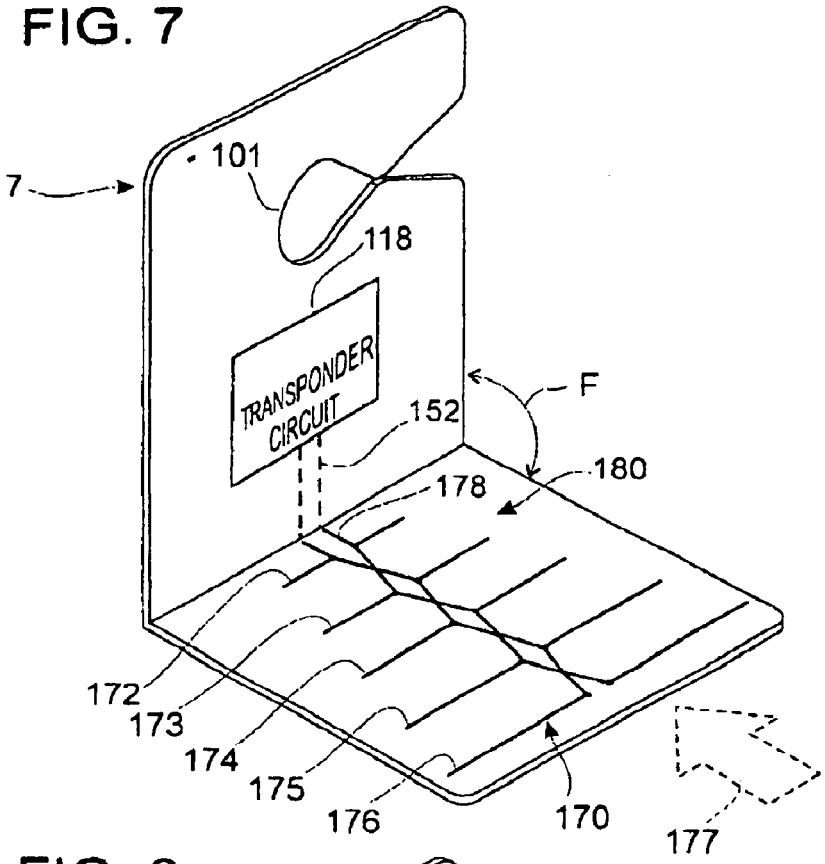
FIG. 7 is a partially schematic diagram of a third embodiment of RFID hang tag transponder according to the invention.

Although automobile hang tags are conventionally in the form of a flat generally planar sheet material there is no fundamental or operational restriction to such a shape, and FIG. 7 shows an auto hang tag 7 with a folded configuration that makes it somewhat 3-dimensional rather than 2-dimensional. Auto hang tag 7 may be provided with an engagement opening 101 for securing on an arm of a rear view mirror. On its upper portion it may also be provided with a transponder circuit similar to those previously described using printed circuit and integrated circuit technology. The antenna portion 170 of the hang tag 7 is of a flat planar configuration but it is disposed at an angle F relative to the upper portion with transponder circuit 118. Angle F is preferably selected to be about 90 degrees or less so that the hang tag antenna portion 170 will be approximately horizontal, rather than vertical as in the previously described embodiments.

A horizontal antenna configuration in FIG. 7 has the advantage that more highly directive and higher gain antenna structures in general communication use can be adapted for use in the RFID transponder of the hang tag. For example, a log periodic antenna is schematically illustrated in FIG. 7. A plurality of simple dipoles 172, 173, 174, 175 and 176 are situated in a horizontal array with their axis perpendicular to the upper portion of auto hang tag 7. In accordance with well known design considerations for log periodic antennas the dipoles 172–176 are of increasing length at greater distances from transponder circuit 118. The dipoles 172–176 are connected by a harness 171 which in usual practice introduces a 180 degree phase shift between successive dipoles. The resulting antenna configuration provides a high gain, highly directive antenna for reception or transmission in the direction of arrow 177 shown in dashed lines. The hang tag of FIG. 7 (and other embodiments) preferably provides a minimum space of 2×4 inches (5 by 10 centimeters) for the antenna elements.

To utilize the directivity of auto hang tag 7 in an automobile one would situate the antenna portion extending in the opposite position of the desired directivity. That is, for reception and transmission through the automobile windshield one would locate the antenna portion 170 extending toward the rear of the vehicle, and, conversely, for rear window reception the antenna portion 170 would extend toward the windshield of the vehicle. In the example illustrated in FIG. 7 the transponder circuit 118 is of the passive type not requiring a battery due, in part, to the high gain characteristic of the associated antenna. The log periodic antenna of FIG. 7 may be designed to have a relatively broad band width (and greater energy reception) if desired, but that would not in all cases be desirable. The angle F shown in FIG. 7 is somewhat less than 90 degrees and approximately 75 degrees to cause the orientation of the antenna ray formed by dipoles 172–176 to be oriented very nearly horizontally when the auto hang tag 7 is hanging in place at a vehicle rear view mirror. The directivity of the antenna is thereby aligned with the vehicle rear window or windshield as desired. Alternatively, the angle F could be somewhat adjustable by the user to accommodate different vehicle configurations.

Figure 8:
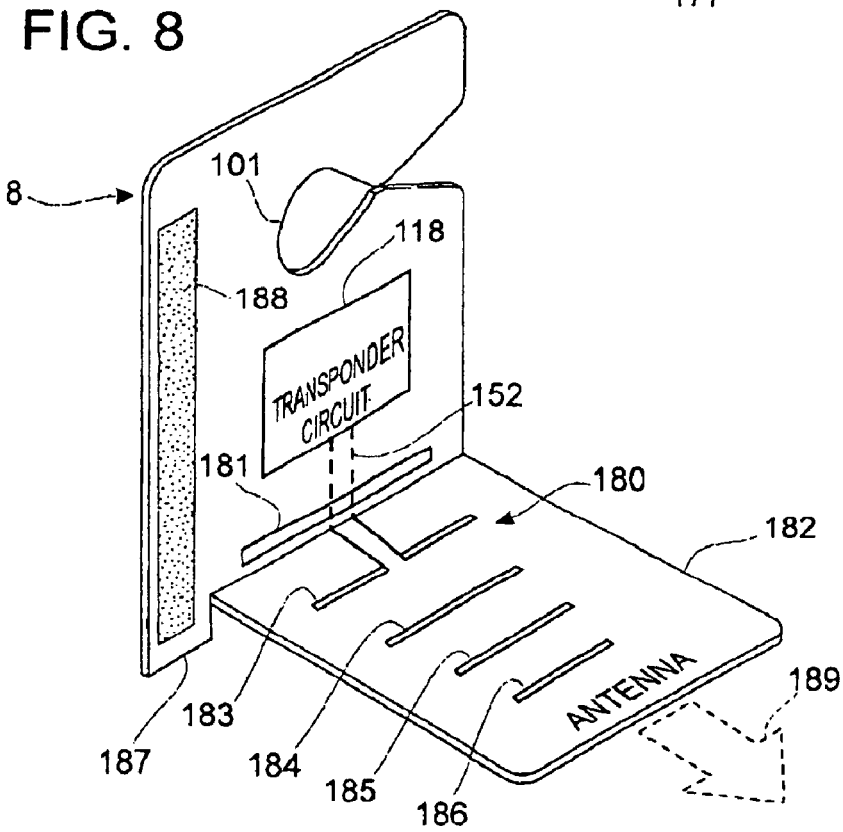
FIG. 8 is a partially schematic diagram of a fourth embodiment of RFID hang tag transponder according to the invention.

Another preferred embodiment illustrated in FIG. 8 shows an auto hang tag having an L-shaped configuration similar to FIG. 7, but with a different form of monodirectional antenna. Hang tag 8 is provided with an engagement opening 101 and a magnetic strip 188 allowing it a dual purpose use. The hang tag 8 has an extension tab 187 to accommodate a desired length of magnetic strip 188 if necessary. The auto hang tag 8 of FIG. 8 as well as all other embodiments normally will be provided front and/or back with visible indicia or optically readable indicia which is not shown in FIGS. 6–8 for clarity of illustration. Hang tag 8 has a transponder circuit 118 connected by a transmission line 152 to a simple dipole antenna 183 formed by metallic strips on a flap 182 embodying antenna 180 of auto hang tag 8.

Associated with the dipole 183 is a reflector 181 in the form of a metallic strip on the main vertical portion of hang tag 8. If desired, metallic strip 181 could alternatively be located on flap 182. Further metallic strips 184, 185 and 186 serve as directors thereby providing a Yagi antenna configuration with a directivity indicated by arrow 189 in dashed lines. This Yagi antenna for the RFID transponder for auto hang tag 8 may be configured for a particular frequency of operation using frequency scaling techniques for the very common Yagi antenna design used in numerous forms of radio frequency communication apparatus. As is well understood, a Yagi antenna as shown in FIG. 8 will have a highly directional radiation pattern principally in the direction of arrow 189 and will provide an antenna gain many times greater than a simple dipole antenna.

The amount of improvement in gain over a simple dipole antenna required for a particular implementation of the invention will depend upon operational requirements such as range and interference rejection. It should be noted that even a simple dipole antenna has some degree of directivity with radiation in a direction endwise discriminated against as compared with the broadside directions. Thus, when the antenna to be associated with the RFID transponder of a hang tag is described or defined as directive or directional it should be understood that the directional quality is not only the inherent directionality incidental to the use of a simple dipole antenna.

The use of the RFID system with auto hang tags according to the invention presently deemed to be of primary importance is vehicle control and monitoring in parking facilities. The invention is not limited to such uses however, and may find uses in highway toll collection or traffic control or other future uses beyond those specifically described herein.

While numerous variations and modifications for the invention have been described shown or suggested above, it should be understood that other modifications and alternative embodiments will be apparent to those skilled in the art and accordingly the scope of the invention is not to be deemed limited to those variations specifically described shown or suggested, but is rather to be determined by reference to the appended claims.

What is claimed is:

1. Vehicle monitoring apparatus using radio frequency identification technology comprising:

a transportable RFID interrogator having a transceiver with a transmitting antenna;

a plurality of individually encoded auto hang tags incorporating RFID transponders and suitable for affixing temporarily in a vehicle interior, each of said hang tags having at least one flat surface area with visible indicia thereon and configured to be affixed with the normal to said flat surface generally along a horizontal sight path through a window of said vehicle;

each said RFID transponder including a memory element having encoded readable data, a controller microcircuit connected to read from said memory element, a modulator configured to be operated by said controller microcircuit, a receiver with at least one directional antenna coupled to provide a received signal to said control microcircuit, and a coupling between said modulator and said at least one horizontally directional antenna for causing transmission therefrom to be modulated in response to data read from said memory element.

2. Apparatus as recited in claim 1 wherein said at least one directional antenna has directionality favoring the direction of a normal to said flat surface and disfavoring directions 45 degrees or more horizontally from said normal.

3. Apparatus as recited in claim 2 wherein one said directional antenna also has vertical directionality favoring a horizontal direction and disfavoring a vertical or partially vertical direction.

4. Apparatus as recited in claim 1 wherein said directional antenna comprises an active dipole element and, at least one director element horizontally spaced from said active dipole element.

5. Apparatus as recited in claim 1 wherein said directional antenna comprises a plurality of active dipole elements.

6. Apparatus as recited in claim 1 wherein said directional antenna comprises an elongated conductive element having a convoluted shape in a plane perpendicular to the favored direction of directionality.

7. Vehicle monitoring apparatus using radio frequency identification technology comprising:

a transportable RFID interrogator having a transceiver with a directional transmitting antenna;

a plurality of individually encoded auto hang tags incorporating RFID transponders and suitable for affixing in a vehicle near a rear view mirror, each of said hang tags having at least one flat surface area with visible indicia thereon and configured to be affixed with the normal to said flat surface generally parallel to the vehicle longitudinal axis;

each said RFID transponder including a micro-circuit memory having encoded readable data, a controller microcircuit connected to read from said memory, a modulator configured to be operated by said controller microcircuit, a receiver with a horizontally directional antenna coupled to provide a received signal to said control microcircuit, and a coupling between said modulator and said horizontally directional antenna for causing transmission therefrom to be modulated in response to data read from said memory element.

8. Apparatus as recited in claim 7 wherein one said horizontally directional antenna is horizontally polarized favoring a direction normal to said flat surface and disfavoring directions 45 degrees horizontally from the normal.

9. Apparatus as recited in claim 8 wherein one said horizontally directional antenna also has vertical directionality favoring a horizontal direction and disfavoring a vertical or partially vertical direction.

10. Apparatus as recited in claim 7 wherein one said horizontally directional antenna also has vertical directionality favoring a horizontal direction and disfavoring a vertical or partially vertical direction.

11. Apparatus as recited in claim 7 wherein said horizontally directional antenna comprises an active dipole element and at least one director element horizontally spaced from said active dipole element.

12. Apparatus as recited in claim 7 wherein said horizontally directional antenna comprises a plurality of active dipole elements.

13. Apparatus as recited in claim 7 wherein said horizontally directional antenna comprises an elongated conductive element having a convoluted shape in a plane perpendicular to the favored horizontal direction of directionality.

14. In a vehicle monitoring apparatus using radio frequency identification technology an [auto hang] *identification* tag with radio transponder comprising:

a [hang] tag body having at least one flat surface area with visible indicia thereon and configured to [reside at a rear view mirror] *be oriented* with the normal to said flat surface generally parallel to [the] *a* vehicle [longitudinal] *horizontal* axis;

an RFID transponder embodied in said hang tag body including a microcircuit memory element having encoded readable data, a controller microcircuit connected to read from said memory, a modulator configured to be operated by said controller microcircuit, a receiver coupled to provide a received signal to said controller microcircuit, said receiver having a directional antenna with horizontal directionality favoring [the] *a first* direction [of a normal] *relative* to said flat surface and disfavoring directions 45 degrees or more horizontally from said [normal] *first direction*, and a coupling of said modulator to said at least one directional antenna for causing transmission therefrom to be modulated in response to data read from said memory.

15. Apparatus as recited in claim 14 wherein [one] said directional antenna also has vertical directionality favoring a horizontal direction and disfavoring a vertical or partially vertical direction.

16. Apparatus as recited in claim 15 wherein said directional antenna comprises a plurality of dipole elements.

17. Apparatus as recited in claim [14] *15* wherein said directional antenna comprises an active dipole element and at least one director element horizontally spaced from said active dipole element.

18. Apparatus as recited in claim [14] *15* wherein said directional antenna comprises a plurality of active dipole elements.

19. Apparatus as recited in claim [14] *15* wherein said directional antenna comprises an elongated conductive element having a convoluted shape in a plane perpendicular to the favored direction of directionality.

*20. Apparatus as recited in claim 15 wherein said directional antenna includes at least three dipole elements with at least one being active and at least one being inactive.*

* * * * *